United States Patent
Shudo et al.

(10) Patent No.: US 8,851,053 B2
(45) Date of Patent: Oct. 7, 2014

(54) GAS FUEL SUPPLY APPARATUS

(75) Inventors: Shigeru Shudo, Wako (JP); Masanori Fujinuma, Wako (JP); Hiroaki Kojima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1011 days.

(21) Appl. No.: 12/905,713

(22) Filed: Oct. 15, 2010

(65) Prior Publication Data

US 2011/0088400 A1 Apr. 21, 2011

(30) Foreign Application Priority Data

Oct. 19, 2009 (JP) .................................. 2009-240780

(51) Int. Cl.
| | |
|---|---|
| *F02M 21/02* | (2006.01) |
| *F16K 15/14* | (2006.01) |
| *F02D 19/06* | (2006.01) |
| *F02D 19/02* | (2006.01) |
| *F02M 21/04* | (2006.01) |

(52) U.S. Cl.
CPC .............. *F02D 19/02* (2013.01); *F16K 15/148* (2013.01); *F02M 21/0242* (2013.01); *Y02T 10/36* (2013.01); *F02M 21/04* (2013.01); *F02M 21/0224* (2013.01); *F02M 21/0236* (2013.01); *Y02T 10/32* (2013.01); *F02M 21/0212* (2013.01); *F02D 19/0647* (2013.01)
USPC .......................................... 123/527; 123/590

(58) Field of Classification Search
CPC . F02M 21/02; F02M 21/0212; F02M 21/023; F02M 21/0236; F02M 21/0239; F02M 21/0242; F02D 19/02
USPC ............. 123/525, 527–529, 575–578, 27 GE, 123/299, 300, 590
See application file for complete search history.

(56) References Cited

U.S. PATENT DOCUMENTS

| | | | | | |
|---|---|---|---|---|---|
| 4,421,087 | A | * | 12/1983 | Schuurman | .................... 123/445 |
| 5,070,850 | A | * | 12/1991 | Davis et al. | .................... 123/527 |
| 5,329,908 | A | | 7/1994 | Tarr et al. | |
| 5,507,318 | A | * | 4/1996 | Israelson | ........................ 137/854 |
| 2006/0246177 | A1 | * | 11/2006 | Miki et al. | ...................... 426/24 |

FOREIGN PATENT DOCUMENTS

| | | |
|---|---|---|
| CN | 2616774 Y | 5/2004 |
| JP | 09264197 A * | 10/1997 |
| JP | 2002-364396 A | 12/2002 |

(Continued)

OTHER PUBLICATIONS

JP 2002364396 A (Nobutaka Honma) Dec. 18, 2002 (Machine Translation). [online][retrieved on Jan. 18, 2014]. Retrieved from: JPO Database.*

(Continued)

*Primary Examiner* — Mahmoud Gimie
(74) *Attorney, Agent, or Firm* — Westerman, Hattori, Daniels & Adrian, LLP

(57) ABSTRACT

A gas fuel supply apparatus is constructed to be capable of supplying any one of propane gas and butane gas to a gas engine while switching between the propane gas and the butane gas. A check valve is provided in a gas fuel supply passages corresponding to a gas canister containing the gas fuel of a low working pressure (propane gas). The check valve prevents the gas fuel of a higher working pressure (butane gas) from flowing from a downstream side of the check valve to an upstream side of the check valve.

6 Claims, 11 Drawing Sheets

(56) References Cited

FOREIGN PATENT DOCUMENTS

| JP | 2006-083791 A | 3/2006 |
|---|---|---|
| JP | 2006-097584 A | 4/2006 |
| JP | 2006-207552 A | 8/2006 |
| JP | 2008-106647 A | 5/2008 |
| JP | 2008-255845 A | 10/2008 |
| WO | 2007/079517 A1 | 7/2007 |

OTHER PUBLICATIONS

Notification of Reasons for Refusal dated Nov. 27, 2012, issued in corresponding Japanese Patent Application No. 2009-240780 with Partial translation (5 pages).

European Search Report dated Feb. 4, 2011, issued in corresponding European Patent Application No. 10187854.4.

* cited by examiner

GAS FUEL SUPPLY APPARATUS

FIELD OF THE INVENTION

The present invention relates to gas fuel supply apparatus capable of supplying a gas combustion apparatus with a plurality of types of gas fuels having different working pressures while switching between the plurality of types of gas fuels.

BACKGROUND OF THE INVENTION

Among the conventionally-known gas combustion apparatus are gas engines capable of using a plurality of types of gas fuels, such as propane gas and butane gas, differing from each other in working pressure. One example of such gas engines is disclosed in Japanese Patent Application Laid-Open Publication No. 2008-106647 (hereinafter referred to as "the patent literature"). According to the disclosure of the patent literature, the gas fuels, such as propane gas and butane gas, differing from each other in working pressure are contained in respective gas containers, and these gas containers are provided in fluid communication with the gas engine via respective gas fuel supply passages. The gas fuel to be supplied to the gas engine is switchable between the propane gas and the butane gas via switching valves provided in the individual gas fuel supply passages. The gas fuel supply passages of the propane gas and butane gas (i.e., propane and butane gas fuel supply passages) join together (i.e., communicate with each other) at a position upstream of the gas engine.

Namely, by a human operator performing operation for switching operating states of the switching valves provided in the gas fuel supply passages, a desired gas fuel, selected from between the propane gas and the butane gas, can be supplied to the gas engine. Namely, the propane gas and the butane gas of different working pressures can be used switchably in the gas engine by the human operator selecting any desired one of the propane and butane gas to cause the selected gas to be supplied to the gas engine.

Sometimes, the gas engine is first driven with one of the gas fuels which has a high working pressure, i.e. the butane gas, and then driven with the other gas fuel which has a lower working pressure, i.e. the propane gas. In order to supply the propane gas to the gas engine, the switching valve of the propane gas fuel passage is opened.

Further, because the butane gas fuel supply passage and the propane gas fuel supply passage join together (i.e., communicate with each other) at a position upstream of the gas engine, the butane gas would stay in the propane gas fuel supply passage after the gas engine is driven with the butane gas. The butane gas staying in the propane gas fuel supply passage has a higher gas pressure than the propane gas. Therefore, if the switching valve of the propane gas fuel supply passage is opened to supply the propane gas to the gas engine, the residual butane gas staying in the propane gas fuel supply passage may undesirably flow to the propane gas container through the opened switching valve of the propane gas fuel supply passage.

SUMMARY OF THE INVENTION

In view of the foregoing prior art problems, it is an object of the present invention to provide an improved gas fuel supply apparatus which, when supplying a gas fuel of a low working pressure to a gas combustion apparatus, can reliably prevent a gas fuel of a higher working pressure from flowing to a container that contains the low-working-pressure gas fuel.

In order to accomplish the above-mentioned object, the present invention provides an improved gas fuel supply apparatus for supplying a gas fuel to a gas combustion apparatus, which comprises: a gas container attachment section for attaching thereto a plurality of gas containers that contain respective ones of a plurality of types of gas fuels having different working pressures, the plurality of gas containers attached to the gas container attachment section communicating with corresponding gas fuel supply passages so as to supply the gas fuels to the gas combustion apparatus via the corresponding gas fuel supply passages, the gas fuel supply passage for one of the gas fuels which has a low working pressure and the gas fuel supply passage for the other of the gas fuels which has a higher working pressure than the one gas fuel joining together at a position near and upstream of the gas combustion apparatus; switching valves provided in the gas fuel supply passages, the gas fuel to be supplied to the gas combustion apparatus being switchable between the plurality of types of gas fuels via the switching valves; and a check valve provided in the gas fuel supply passage corresponding to the gas container that contains the gas fuel having the low working pressure, the check valve preventing the gas fuel having the higher working pressure from flowing from a downstream side of the check valve closer to the gas combustion apparatus to an upstream side of the check valve closer to the gas container attachment section (i.e., to the gas container containing the gas fuel of the low working pressure attached to the gas container attachment section).

According to the present invention, the check valve is provided in the gas fuel supply passage corresponding to the gas container that contains the gas fuel having the low working pressure (i.e., with which the gas container that contains the gas fuel of the low working pressure (i.e., low-working-pressure gas fuel) communicates), and thus, the check valve can prevent the gas fuel of the higher working pressure (i.e., higher-working-pressure gas fuel) from flowing from the downstream side of the check valve to the upstream side of the check valve and hence to the gas container containing the low-working-pressure gas fuel attached to the gas container attachment section. Thus, when gas fuel switching has been made so as to drive the gas combustion apparatus with the low-working-pressure gas fuel after the gas combustion apparatus is driven with the higher-working-pressure gas fuel, the check valve can prevent the higher-working-pressure gas fuel from undesirably flowing from the downstream side of the check valve closer to the gas combustion apparatus to the downstream side of the check valve closer to the gas container containing the low-working-pressure gas fuel.

Preferably, the gas fuel supply apparatus of the present invention further comprises a relief valve provided, in the gas fuel supply passage corresponding to the gas container that contains the gas fuel of the low working pressure, between the check valve and the gas container attachment section (and hence the gas container containing the gas fuel of the low working pressure attached to the gas container attachment section). Thus, in the gas fuel supply passage for the low-working-pressure gas fuel, the low-working-pressure gas fuel can be adjusted, via the relief valve, so as not to exceed a predetermined pressure.

The relief valve is set at a predetermined valve-opening pressure (at which the relief valve opens) in accordance with the low-working-pressure gas fuel. Thus, the relief valve may open once the higher-working-pressure gas fuel flows to the relief valve. For this reason, the relief valve is provided between the check valve and the gas container attachment section (i.e., the gas container that contains the low-working-pressure gas fuel). Thus, the relief valve can be prevented from opening due to the higher-working-pressure gas fuel, by the check valve operating to prevent the higher-working-pressure gas fuel from flowing to the relief valve.

Preferably, the check valve includes a valve seat, and a valve body formed of an elastic material into a dome shape and mounted on the valve seat, the valve seat having a gas passage formed therethrough, the gas passage being normally closed with the valve body so that the gas fuel of the higher working pressure can be prevented from flowing from the downstream side of the check valve to the upstream side of the check valve (i.e., to the gas container containing the gas fuel of the low working pressure).

Thus, even when the gas fuel pressure on the upstream side of the check valve closer to the container containing the low-working-pressure gas fuel is slightly higher than the gas fuel pressure on the downstream side of the check valve closer to the gas combustion apparatus, the valve body of the check valve can operate appropriately and reliably to supply the low-working-pressure gas fuel to the gas combustion apparatus in an appropriate manner.

Further, even when the gas fuel pressure on the downstream side of the check valve closer to the gas combustion engine is slightly higher than the gas fuel pressure on the upstream side of the check valve closer to the container containing the low-working-pressure gas fuel, the valve body of the check valve can operate appropriately and reliably to prevent the gas fuel from the downstream side to the upstream side (and hence to the container containing the low-working-pressure gas fuel).

Namely, because the valve body of the check valve is formed of an elastic material, an appropriate and reliably valve action can be secured even when a pressure difference (differential pressure) between the downstream side of the check valve closer to the gas combustion apparatus and the upstream side of the check valve closer to the container containing the low-working-pressure gas fuel. Because an appropriate and reliably valve action can be secured as noted above, the present invention allows the plurality of types of gas fuels to be used switchably in an appropriate manner.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
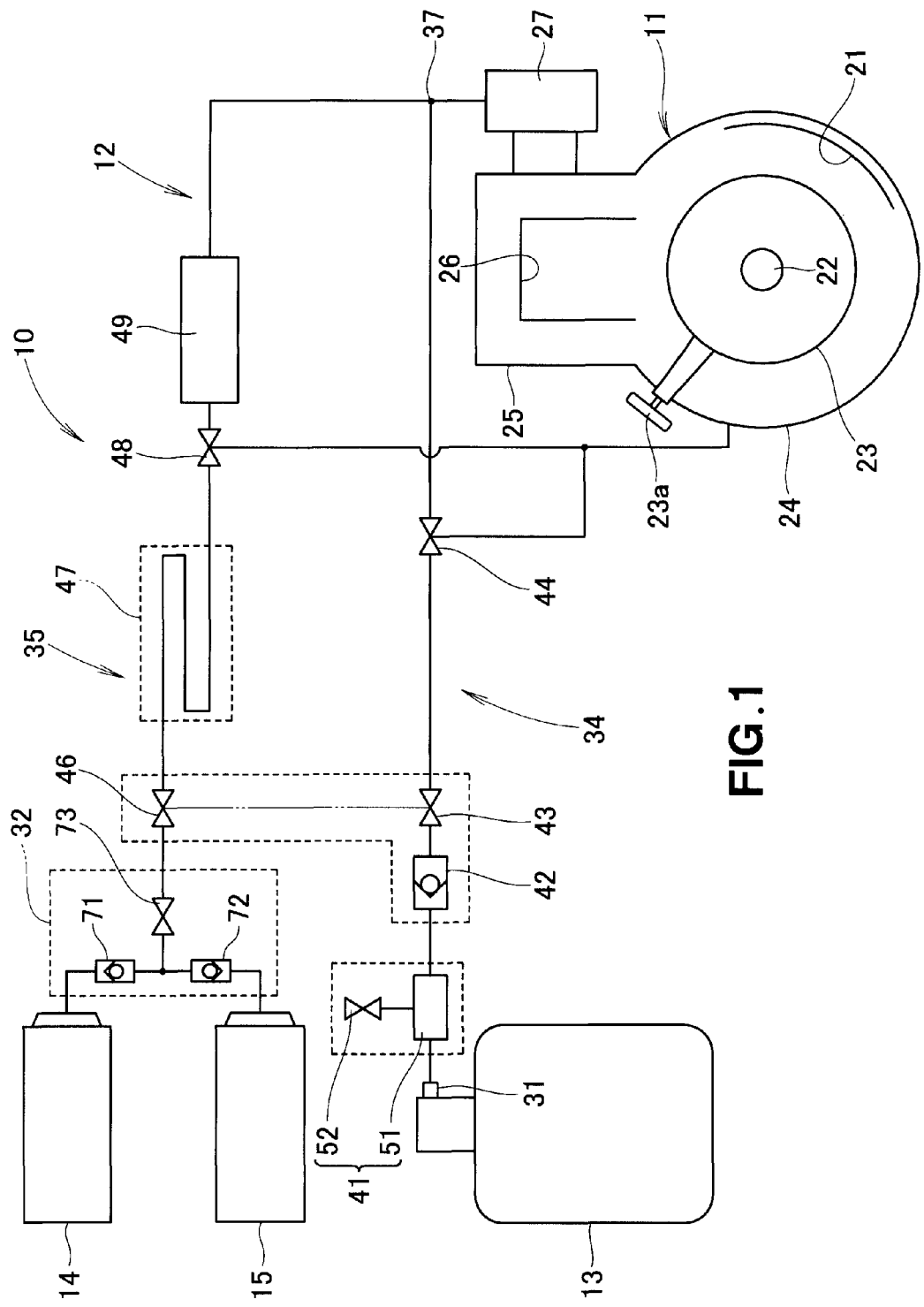
FIG. 1 is a block diagram showing a general construction of a gas engine system equipped with an embodiment of a gas fuel supply apparatus of the present invention.

Reference is now made to FIG. 1 illustrating in block diagram a general construction of a gas engine system 10 equipped with an embodiment of a gas fuel supply apparatus 12 of the present invention. The gas engine system 10 includes: a gas engine (i.e., gas combustion apparatus) 11 drivable with a plurality of types of gas fuels; the gas fuel supply apparatus 12 capable of supplying a plurality of types of gas fuels to the gas engine 11; a gas ganister (i.e., gas container) 13 detachably attachable to the gas fuel supply apparatus 12; first and second cassette gas ganisters (i.e., gas containers) 14 and 15 detachably attachable to the gas fuel supply apparatus 12.

The gas fuels used in the instant embodiment are liquid petroleum gas (LPG) fuels of different working pressures, such as propane gas (i.e., gas fuel having a low working pressure) and butane gas (i.e., gas fuel having a relatively high working pressure).

The propane gas is contained in the gas canister 13, which is set at a predetermined inner pressure (hereinafter referred to as "pressure $P_P$" for convenience of description) with the propane gas contained therein. The propane gas is taken out or let out from the gas canister 13 in gas form; the propane gas will hereinafter be referred to also as "propane fuel". The propane fuel let out from the gas canister 13 has a gas pressure (hereinafter referred to as "propane gas pressure") that is equal to the above-mentioned pressure $P_P$.

The butane gas is contained in the first and second cassette gas canisters 14 and 15, whose inner pressures are each set at $P_B$. The butane gas is let out from the cassette gas canisters 14 and 15 in liquid form; the butane gas will hereinafter be referred to also as "butane fuel". The butane gas let out from the first and second cassette gas canisters 14 and 15 has a gas pressure (hereinafter referred to as "butane fuel pressure $P_B$" for convenience of description). The butane fuel pressure $P_B$ is set higher than the propane gas pressure $P_P$.

In the gas engine 11, a recoil starter 23 is connected to a crankshaft 22. The gas engine 11 can be driven by a human operator manually operating an operation knob 23a of the recoil starter 23. The crankshaft 22 is rotatably mounted in a crankcase 21.

In the gas engine 11, an air-gas mixer 27 supplies a mixture of propane gas and air to a combustion chamber 26 of an engine block 24 (cylinder 25) with the gas canister 13 connected or attached to the gas fuel supply apparatus 12. The gas engine 11 (more specifically, the crankshaft 22) is driven by the mixture of propane gas and air being combusted in the combustion chamber 26.

Further, in the gas engine 11, the mixer 27 supplies a mixture of butane gas and air to the combustion chamber 26 of the engine block 24 (cylinder 25) with the first and second cassette gas canisters 14 and 15 connected or attached to the gas fuel supply apparatus 12. The gas engine 11 (crankshaft 22) is driven by the mixture of butane gas and air being combusted in the combustion chamber 26.

The gas fuel supply apparatus 12 includes: a mouthpiece setting section (gas container attachment means) 31 to which the gas canister 13 is detachably attachable; a mouthpiece setting section unit (gas container attachment means) 32 to which the first and second cassette gas canisters 14 and 15 are detachably attachable; the mixer 27 provided downstream of the mouthpiece setting section 31 and mouthpiece setting section unit 32 and communicating with the combustion chamber 26; a propane gas fuel supply passage 34 communicating between the mixer 27 and the mouthpiece setting section 31; and a butane gas fuel supply passage 35 communicating between the mixer 27 and the mouthpiece setting section unit 32.

The propane gas fuel supply passage 34 is a flow passage for communicating the gas canister 13 with the mixer 27, and the butane gas fuel supply passage 35 is a flow passage for communicating the first and second cassette gas canisters 14 and 15 with the mixer 27. The butane gas fuel supply passage 35 includes a vaporizer (heater) 47 for vaporizing the butane fuel let out from the first and second cassette gas canisters 14 and 15.

The propane gas fuel supply passage 34 and butane gas fuel supply passage 35 join together at a position 37 upstream of the mixer 27 and hence the gas engine 11. The mixer 27 is constructed to be applicable to both of the propane gas and butane gas.

As further shown in FIG. 1, the gas fuel supply apparatus 12 includes, in the propane gas fuel supply passage 34, a regulator unit 41, a check valve 42, a propane switching valve (switching means) 43 and a propane shutoff valve 44 disposed in the order mentioned in an upstream-to-downstream direction (i.e., in a direction from the mouthpiece setting section 31 toward the mixer 27).

Namely, in the propane gas fuel supply passage 34, the regulator unit 41 is provided immediately downstream of the mouthpiece setting section 31, and the check valve 42 is provided immediately downstream of the regulator unit 41. Further, the propane switching valve 43 is provided downstream of the check valve 42, and the propane shutoff valve 44 is provided immediately downstream of the propane switching valve 43. Furthermore, the mixer 27 is provided downstream of the propane shutoff valve 44.

Further, the gas fuel supply apparatus 12 includes, in the butane gas fuel supply passage 35, a butane switching valve (switching means) 46, the vaporizer 47, a button shutoff valve 48 and a butane regulator 49 in the order mentioned in a direction from the mouthpiece setting section unit 32 toward the mixer 27.

Namely, in the butane gas fuel supply passage 35, the butane switching valve 46 is provided immediately downstream of the mouthpiece setting section unit 32, and the vaporizer 47 is provided immediately downstream of the butane switching valve 46. Further, the button shutoff valve 48 is provided immediately downstream of the vaporizer 47, and the butane regulator 49 is provided immediately downstream of the button shutoff valve 48. Furthermore, the mixer 27 is provided downstream of the butane regulator 49.

The propane switching valve 43 provided in the propane gas fuel supply passage 34 is a valve for switching the propane gas fuel supply passage 34 between open and closed states, while the butane switching valve 46 provided in the butane gas fuel supply passage 35 is a valve for switching the butane gas fuel supply passage 35 between open and closed states.

The propane gas contained in the gas canister 13 can be supplied to the mixer 27 by the butane gas fuel supply passage 35 being switched to the closed state via the butane switching valve 46 and the propane gas fuel supply passage 34 being switched to the open state via the propane switching valve 43. Likewise, the butane gas contained in the first and second cassette gas canisters 14 and 15 can be supplied to the mixer 27 by the butane gas fuel supply passage 35 being switched to the open state via the butane switching valve 46 and the propane gas fuel supply passage 34 being switched to the closed state via the propane switching valve 43.

The regulator unit 41 provided in the propane gas fuel supply passage 34 includes a propane regulator 51 and a relief valve 52. The propane regulator 51 is a member for adjusting the gas pressure of the propane gas in the propane gas fuel supply passage 34 to a predetermined propane pressure P1 of, for example, 2.8 kPa. The propane gas can be used in the gas engine 11 by the pressure of the propane gas being lowered to the predetermined propane pressure P1 via the propane regulator 51.

The relief valve 52 is a valve that, once the gas pressure of the propane gas flowing in the propane gas fuel supply passage 34 exceeds a predetermined opening pressure of, for example, 5.6 kPa, opens to relieve the propane gas from the propane gas fuel supply passage 34 to the atmosphere.

Figure 2:
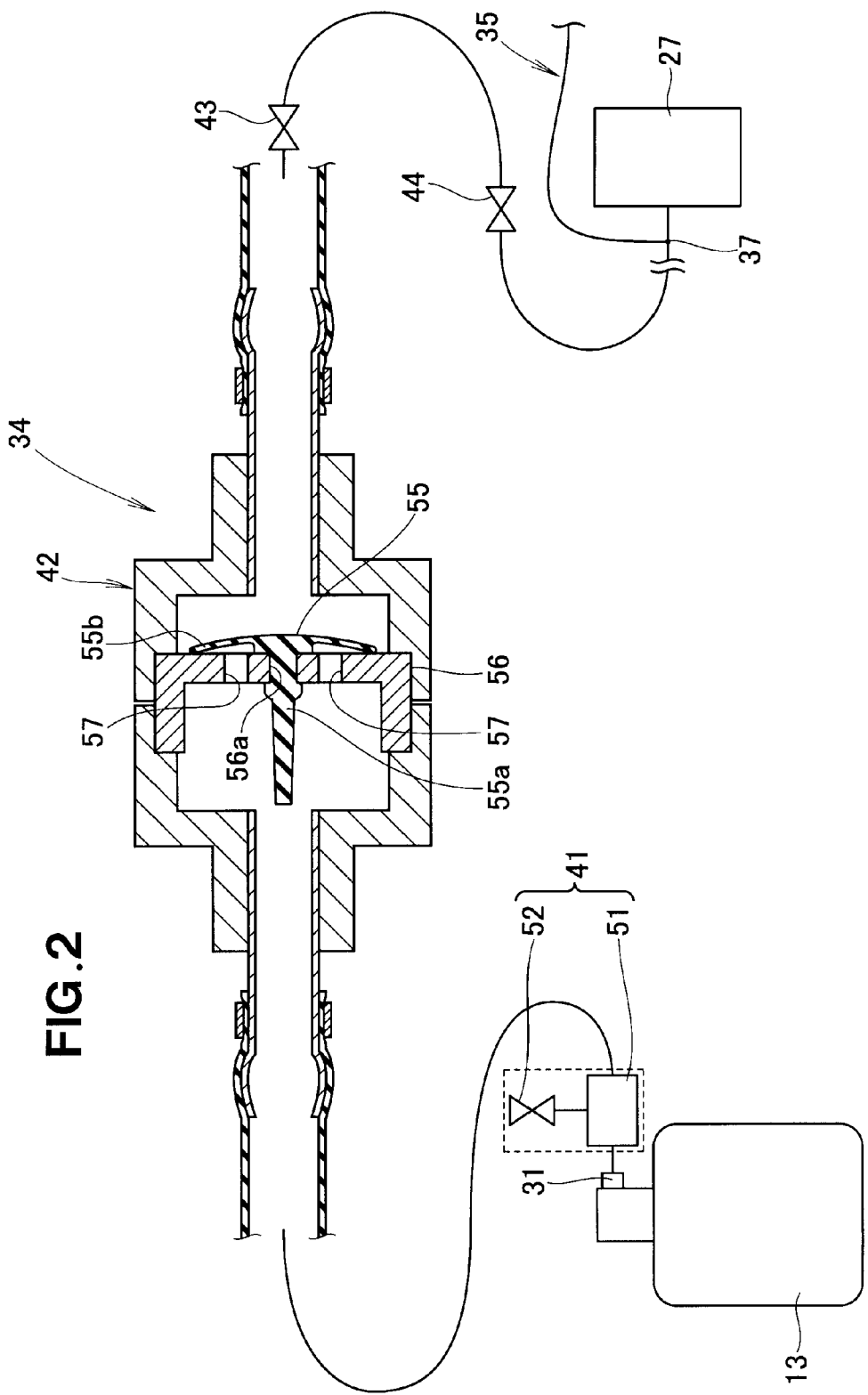
FIG. 2 is a sectional view of a check valve provided in the gas fuel supply apparatus of FIG. 1.

As shown in FIG. 2, the check valve 42 is a so-called umbrella valve which includes a valve seat 56, a valve body 55 formed of an elastic material into a dome shape to provide a dome section 55b, and a support shaft 55a for supporting the valve body 55. The support shaft 55a is inserted through a mounting hole 56a formed in the valve seat 56.

The check valve 42 is normally kept in a closed state. Once a primary-side pressure of the check valve 42 (i.e., pressure on the side of the check valve 42 closer to the relief valve 52 or regulator-unit 41, or relief-valve-side pressure) exceeds a predetermined value, the dome section 55b of the valve body 55 elastically deforms so that gas passages 57 formed through the valve seat 56 are opened. Thus, the propane gas is allowed to flow from the primary side of the check valve 42 (i.e., from the side of the check valve 42 closer to the regulator unit 41, or regulator-unit side of the check valve 42) to a secondary side (i.e., to the side of the check valve 42 closer to the propane switching valve 43, or propane-switching-valve side).

Further, once the secondary-side pressure (i.e., propane-switching-valve-side pressure) increases as compared to the primary-side pressure (i.e., relief-valve-side pressure) so that a pressure difference (differential pressure) $\Delta Pv$ between the primary-side pressure and the secondary-side pressure exceeds a predetermined setting value, a radially outer peripheral surface of the valve body 55 is brought to abutment against the valve seat 56 to thereby close the gas passages 57. Thus, the check valve 42 can prevent the butane gas from flowing from the secondary side (propane-switching-valve side) of the check valve 42 to the primary side (i.e., regulator-unit side) of the check valve 42 and particularly to the gas canister 13. In other words, the check valve 42 can prevent the gas fuel of the higher working pressure from flowing from the downstream side of the check valve 42 closer to the gas engine (gas combustion apparatus) 11 to the upstream side of the check valve 42 closer to the gas container attachment means (and hence to the gas container containing the low-working-pressure gas fuel attached to the gas container attachment means).

Because the valve body 55 of the check valve 42 is formed of an elastic material as noted above, the valve body 55 can be elastically deformed with a minute pressure. Thus, an appropriate and reliable valve action of the check valve 42 can be secured even when the pressure difference (differential pressure) $\Delta Pv$ between the primary-side pressure (i.e., relief-valve-side pressure) of the check valve 42 and the secondary-side pressure (propane-switching-valve side) of the check valve 42 is minute.

Further, because a so-called umbrella valve is employed as the check valve 42, the check valve 42 can be simplified in construction. As a result, the check valve 42 can be reduced in weight and size, and design freedom of the check valve 42 can be enhanced.

Figure 3:
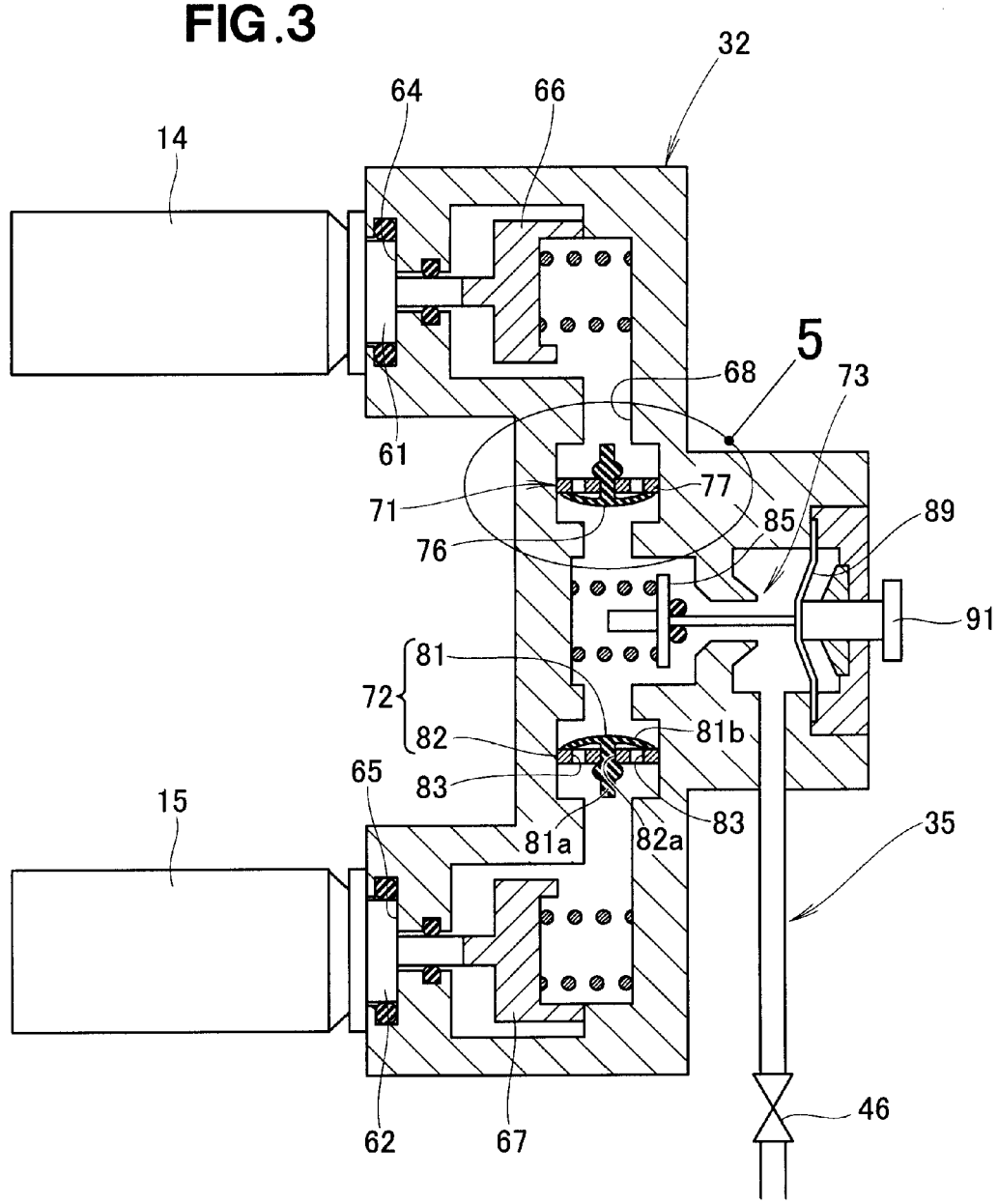
FIG. 3 is a sectional view of a mouthpiece setting section unit provided in the gas fuel supply apparatus of FIG. 1.
Figure 4:
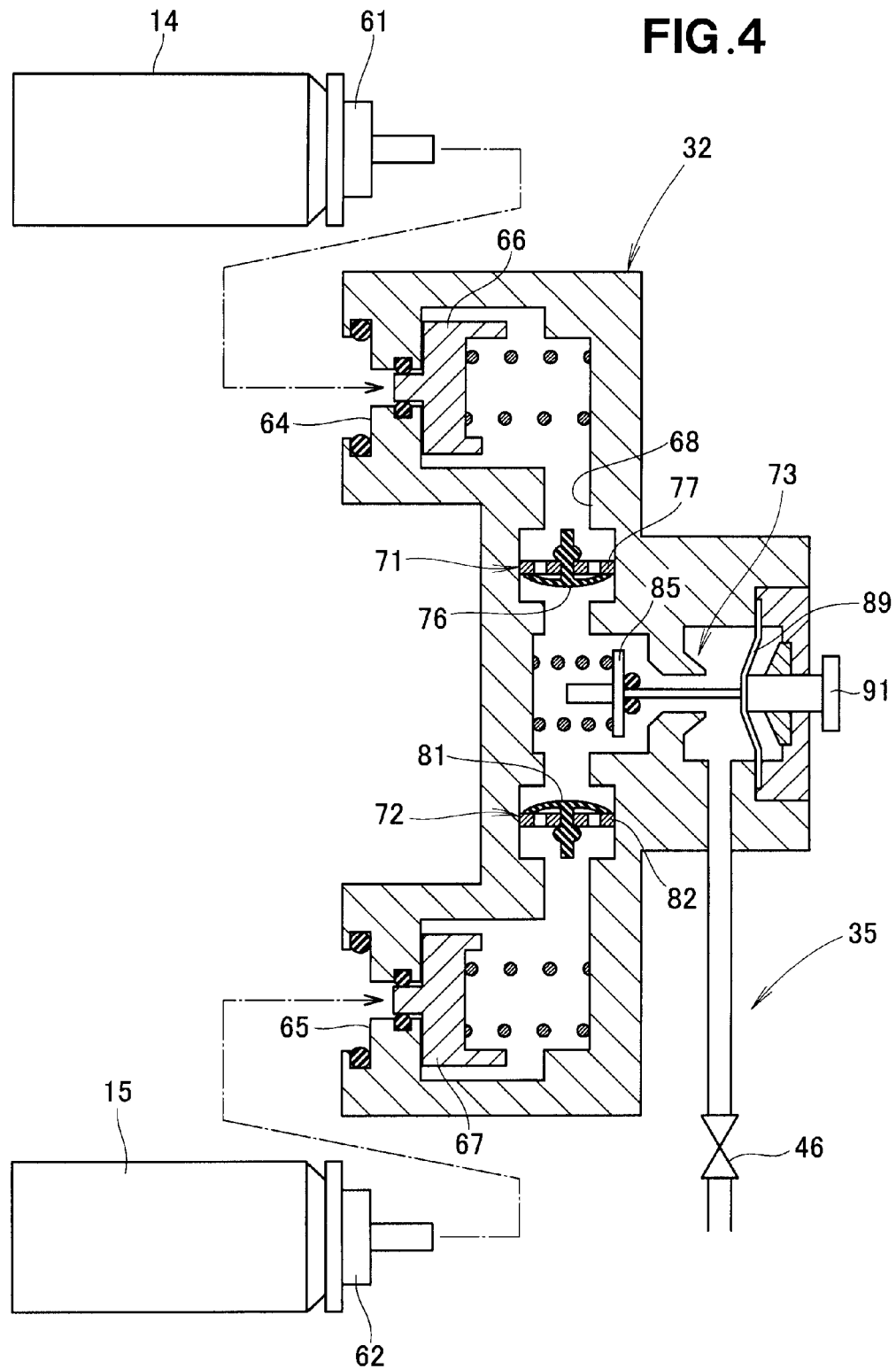
FIG. 4 is a sectional view of the mouthpiece setting section unit with cassette gas canisters removed therefrom for clarity.

As shown in FIGS. 3 and 4, the mouthpiece setting section unit 32 includes: first and second mouthpiece setting sections 64 and 65 to which mouthpieces 61 and 62 of the first and second cassette gas ganisters 14 and 15 are detachably attachable; a communication passage 68 communicating between the first and second mouthpiece setting sections 64 and 65 in parallel with each other; a first one-way valve 66 provided in the communication passage 68 adjacent to or in association with the first mouthpiece setting section 64; and a second one-way valve 67 provided in the communication passage 68 adjacent to or in association with the second mouthpiece setting section 65.

The mouthpiece setting section unit 32 further includes: a first check valve 71 provided in the communication passage 68 adjacent to or in association with the first one-way valve 66; a second check valve 72 provided in the communication passage 68 adjacent to or in association with the second one-way valve 67; and a pressure-responsive valve 73 provided downstream of the first and second check valves 71 and 72.

Figure 5:
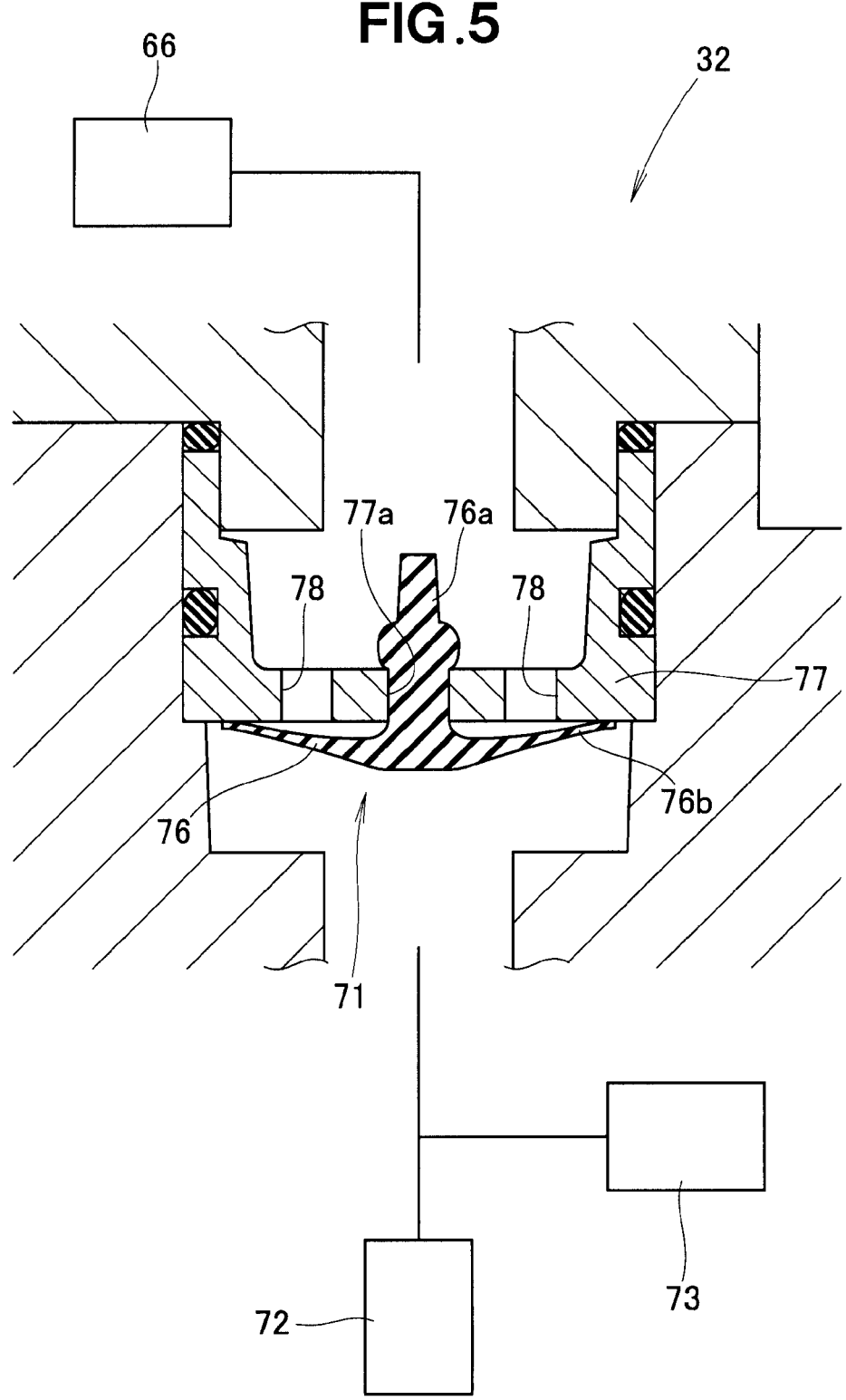
FIG. 5 is an enlarge view of a section encircled at 5 in FIG. 3.

As shown in FIG. 5, the first check valve 71 is a valve corresponding to the first cassette gas canister 14 (see FIG. 3). More specifically, the first check valve 71 is a so-called umbrella valve which includes a valve seat 77, a valve body 76 formed of an elastic material into a dome shape to provide a dome section 76b, and a support shaft 76a for supporting the valve body 76. The support shaft 76a is inserted through a mounting hole 77a formed in the valve seat 77.

The first check valve 71 is normally kept in a closed state. Once a primary-side pressure of the first check valve 71 (i.e., pressure on the side of the first check valve 71 closer to the first one-way valve 66, or first-one-way-valve-side pressure) exceeds a predetermined value, the dome section 76b of the valve body 76 elastically deforms so that gas fuel passages 78 formed through the valve seat 77 are opened. Thus, the butane fuel is allowed to flow from the primary side (i.e., first-one-way-valve side) of the first check valve 71 to a secondary side (i.e., side closer to the second check valve 72, or second-check-valve side) of the first check valve 71.

Once a secondary-side pressure (i.e., pressure on the second-check-valve side) of the first check valve 71 increases as compared to a primary-side pressure (i.e., pressure on the first-one-way-valve side) of the first check valve 71 so that a pressure difference (differential pressure) $\Delta Pv1$ between the primary-side pressure and the secondary-side pressure exceeds a predetermined setting value, a radially outer peripheral surface of the dome section 76b of the valve body 76 is brought to abutment against the valve seat 77 to thereby close the fuel passages 78. Thus, the first check valve 71 can prevent the butane fuel from flowing from the secondary side (second-check-valve side) of the first check valve 71 to the primary side (i.e., first-one-way-valve side).

Because the valve body 76 of the first check valve 71 is formed of an elastic material as noted above, the valve body 76 can be elastically deformed with a minute pressure. Thus, an appropriate and reliable valve action of the first check valve 71 can be secured even when the pressure difference (differential pressure) $\Delta Pv1$ between the primary-side pressure and the secondary-side pressure of the first check valve 71 is minute.

Further, because a so-called umbrella valve is employed as the first check valve 71, the first check valve 71 can be simplified in construction. As a result, the first check valve 71 can be reduced in weight and size, and design freedom of the check valve 71 can be enhanced.

As seen in FIGS. 3 and 4, the second check valve 72 is generally identical in construction and behavior to the first check valve 71.

Namely, the second check valve 72 is a valve corresponding to the second cassette gas canister 15. More specifically, the second check valve 72 is a so-called umbrella valve which includes a valve seat 82, a valve body 81 formed of an elastic material into a dome shape to provide a dome section 81b, and a support shaft 81a for supporting the valve body 81. The support shaft 81a is inserted through a mounting hole 82a formed in the valve seat 82.

The second check valve 72 is normally kept in a closed state. Once a primary-side pressure (i.e., pressure on the side of the second check valve 72 closer to the second one-way valve 67, or second-one-way-valve side) exceeds a predetermined value, the dome section 81b of the valve body 81 elastically deforms so that gas fuel passages 83 formed through the valve seat 82 are opened. Thus, the butane fuel is allowed to flow from the primary side (i.e., second one-way valve side) to a secondary side (i.e., side of the second check valve 72 closer to the first check valve 71, or first-check-valve side).

Once a secondary-side pressure (i.e., pressure on the first-check-valve side) increases as compared to a primary-side pressure (i.e., pressure on the second-one-way-valve side) so that a pressure difference (differential pressure) $\Delta Pv2$ between the primary-side pressure and the secondary-side pressure exceeds a predetermined setting value, a radially outer peripheral surface of the dome section 81b of the valve body 81 is brought to abutment against the valve seat 82 to thereby close the fuel passages 83. Thus, the second check valve 72 can prevent the butane fuel from flowing from the secondary side (first-check-valve side) of the second check valve 72 to the primary side (i.e., second-one-way-valve side) of the second check valve 72.

Because the valve body 81 of the second check valve 72 is formed of an elastic material as noted above, the valve body 81 can be deformed with a minute pressure. Thus, an appropriate and reliable valve action of the second check valve 72 can be secured even when the pressure difference (differential pressure) $\Delta Pv2$ between the primary-side pressure (i.e., second-one-way-valve-side pressure) and the secondary-side pressure (first-check-valve-side pressure or pressure-responsive-valve-side pressure) of the second check valve 72 is minute.

Further, because a so-called umbrella valve is employed as the second check valve 72, the second check valve 72 can be simplified in construction. As a result, the second check valve 72 can be reduced in weight and size, and design freedom of the check valve 72 can be enhanced.

The pressure-responsive valve 73 keeps the butane gas fuel supply passage 35 in the open state while a secondary-side pressure of the pressure-responsive valve 73 (i.e., pressure on the side of the pressure-responsive valve 73 closer to the butane switching valve 46, or butane-switching-valve side) is higher than a minimum butane pressure P3 in a range of, for example, 600 to 700 kPa. Further, once the secondary-side pressure decreases to the minimum butane pressure P3, the pressure-responsive valve 73 closes the butane gas fuel supply passage 35 and keeps the butane gas fuel supply passage 35 in the closed state as long as the secondary-side pressure is below the minimum butane pressure P3.

Referring back to FIG. 1, the butane regulator 49 is a member for adjusting the butane gas in the butane gas fuel supply passage 35 to a predetermined butane pressure P4 of, for example, 10 kPa. The butane gas can be used in the gas engine 11 by the pressure of the butane gas being lowered to the predetermined butane pressure P4 via the butane regulator 49.

Figure 6:
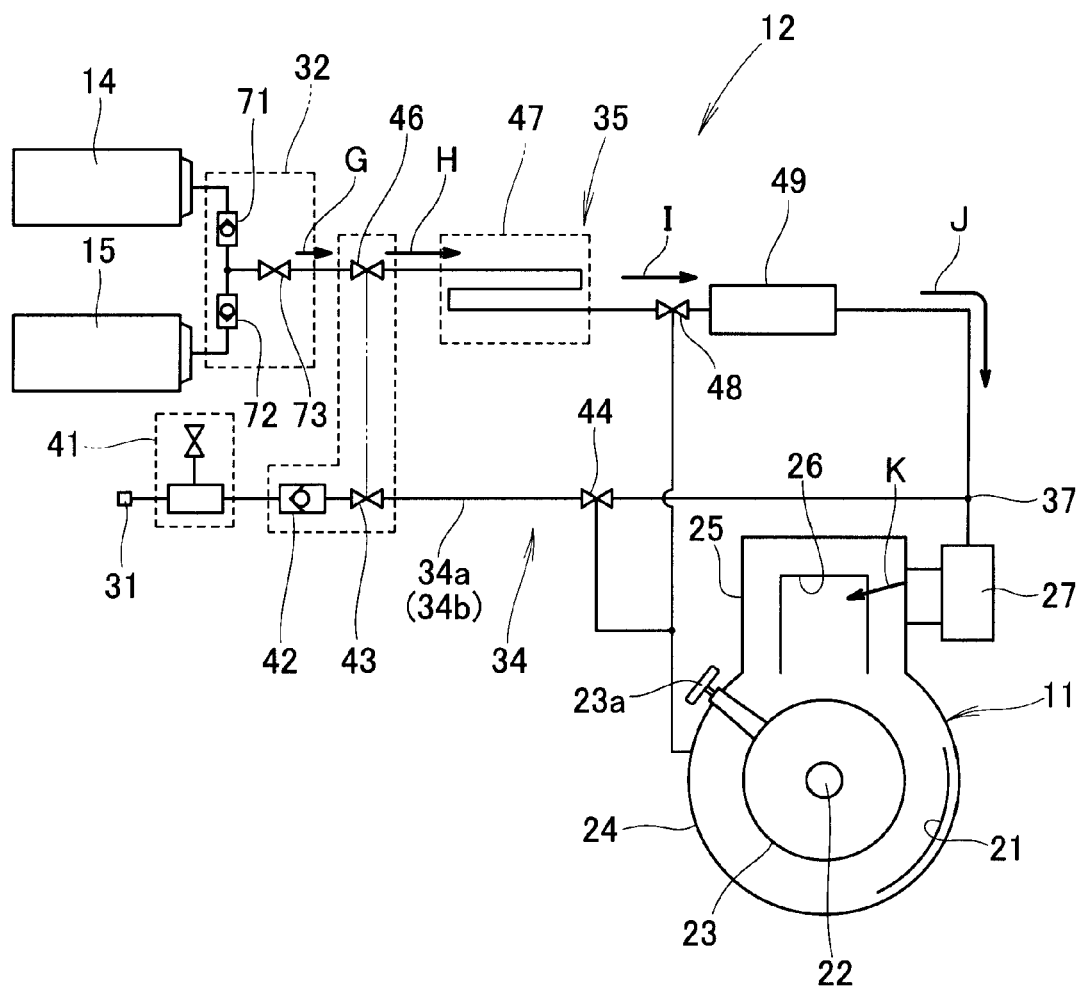
FIG. 6 is a view explanatory of an example manner in which a gas engine is driven using the cassette gas canisters.
Figure 7:
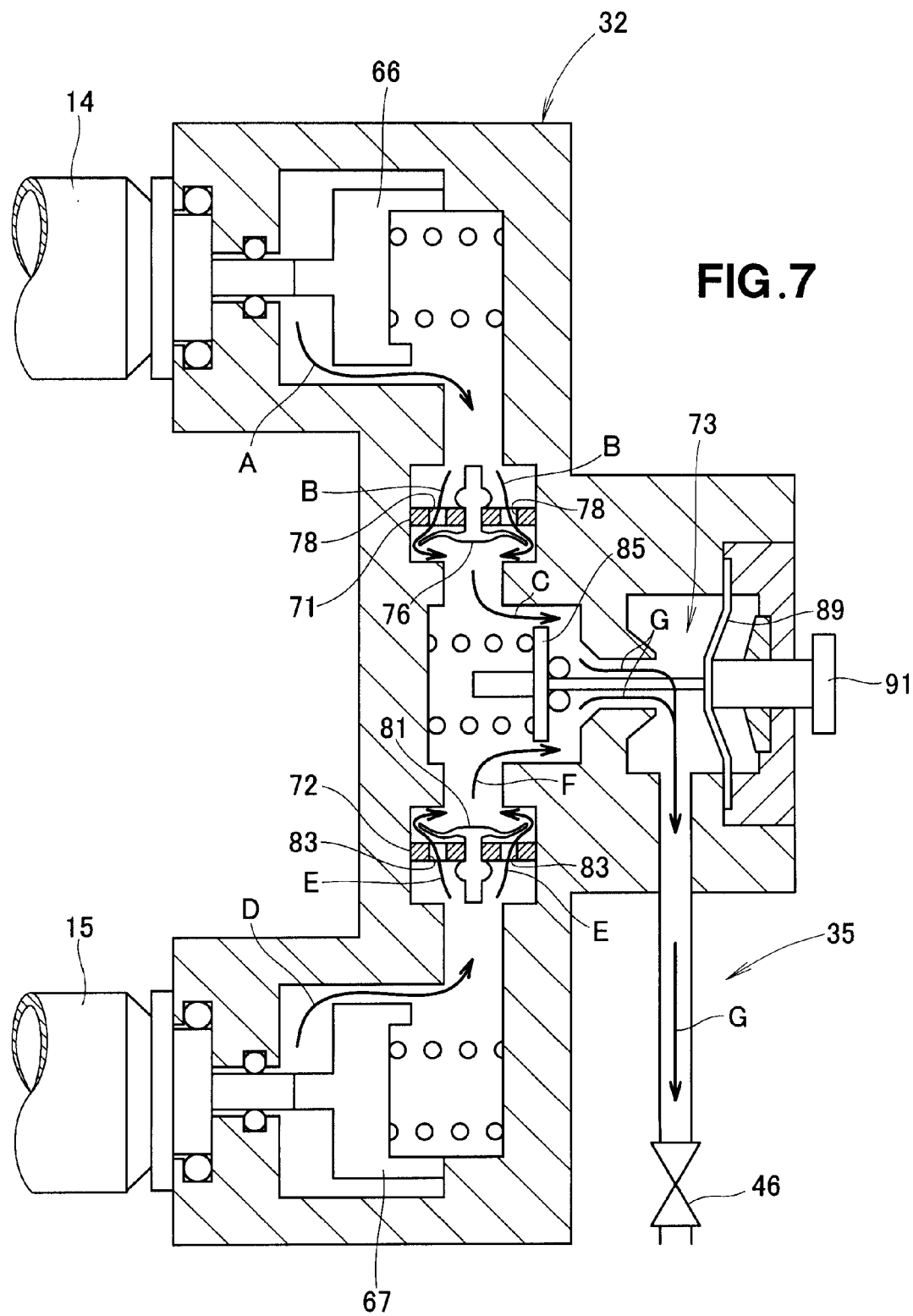
FIG. 7 is a view explanatory of an example manner in which butane gas is directed from the cassette gas canisters of FIG. 6 to the gas fuel supply apparatus.

The following describe an example manner in which the gas engine 11 is driven with the butane gas, with reference to FIGS. 3, 6 and 7. As shown in FIG. 3, the mouthpieces 61 and 62 of the first and second cassette gas canisters 14 and 15 are set onto the first and second mouthpiece setting sections 64 and 65, respectively.

Then, as shown in FIG. 6, the butane gas fuel supply passage 35 is switched to the open state via the butane switching valve 46, while the propane gas fuel supply passage 34 is switched to the closed state via the propane switching valve 43. Further, the human operator manually operates the operation knob 23a of the recoil starter 23, to thereby rotate the crankshaft 22. As the crankshaft 22 rotates like this, the inner pressure of the crankcase 21 decreases to a negative pressure P5 of, for example, −1.5 kPa, in response to which the propane shutoff valve 44 and butane shutoff valve 48 are opened.

Then, as shown in FIG. 7, the butane fuel is let out from the first cassette gas canister 14 and flows to the first check valve 71 by way of the first one-way valve 66 as indicated by arrow A.

By the let-out butane fuel flowing to the first check valve 71, the dome-shaped valve body 76 elastically deforms to open the fuel passages 78. The butane fuel flows through the opened fuel passages 78 as indicated by arrow B, after which the butane fuel flows to the pressure-responsive valve 73 as indicated by arrow C.

Because the valve body 76 of the first check valve 71 is formed of an elastic material, the valve body 76 can be deformed with a minute pressure, and thus, the valve body 76 can operate appropriately and reliably once the primary-side pressure of the first check valve 71 (i.e., pressure on the first-one-way-valve side of the first check valve 71) reaches a predetermined value.

Similarly, the butane fuel is let out from the second cassette gas canister 15 and flows to the second check valve 72 by way of the second one-way valve 67 as indicated by arrow D.

By the let-out butane fuel flowing to the second check valve 72, the dome-shaped valve body 81 elastically deforms to open the fuel passages 83. The butane fuel flows through the opened fuel passages 83 as indicated by arrow E, after which the butane fuel flows to the pressure-responsive valve 73 as indicated by arrow F.

As in the first check valve 71, the valve body 81 of the second check valve 72 is formed of an elastic material, so that the valve body 81 can be deformed with a minute pressure. Thus, the valve body 81 can operate appropriately and reliably once the primary-side pressure of the second check valve 72 (i.e., pressure on the second-one-way-valve side of the second check valve 72) reaches a predetermined value.

The butane gas fuel having flown through the first check valve 71 to the pressure-responsive valve 73 as indicated by arrow C and the butane gas fuel having flown through the second check valve 72 to the pressure-responsive valve 73 as indicated by arrow F are caused to join together at the pressure-responsive valve 73. Then, the thus-joined-together butane gas fuel flows to the butane switching valve 46 (see FIG. 6) as indicated by arrow G in FIG. 7.

Referring back to FIG. 6, the butane fuel, having flown through the butane switching valve 46, flows to the vaporizer 47 as indicated by arrow H, where it is heated (vaporized) into butane gas. Then, the butane gas flows through the butane shutoff valve 48 to the butane regulator 49 as indicated by arrow I, so that the butane gas is adjusted by the butane regulator 49 to the predetermined butane pressure P4 of, for example, 10 kPa. Then, the butane gas, having been adjusted to the predetermined butane pressure P4, flows to the air-gas mixer 27 as indicated by arrow J.

The mixer 27 mixes together the butane gas and air, and the resultant mixture is supplied to the combustion chamber 26 of the engine block 24 (cylinder 25) as indicated by arrow K. Thus, the gas engine 11 (more specifically, crankshaft 22) is driven by the mixture of the butane gas and air being combusted in the combustion chamber 26.

With the gas fuel supply apparatus 12 using the first and second cassette gas canisters 14 and 15 in the manner as set forth above in relation to FIGS. 3, 6 and 7, an increased amount of the butane gas can be used, so that an increased continued operating time of the gas engine system 10 can be secured.

Further, because the valve bodies 76 and 81 of the first and second check valves 71 and 72 (see FIG. 7) are each formed of an elastic material as noted above, an appropriate and reliable valve action of each of the first and second check valves 71 and 72 can be secured, and thus, the butane gas contained in the first and second cassette gas canisters 14 and 15 can continue to be supplied to the gas engine 11 in a stable manner.

Next, a description will be given about an example manner in which flows of the butane gas are controlled via the first and second check valves 71 and 72 when a pressure difference has occurred between the first and second cassette gas canisters 14 and 15. Because the first and second check valves 71 and 72 are generally identical to each other in construction and behavior, the following mainly describe behavior of the second check valve 72, to ease understanding.

During use of the gas engine 11, a temperature difference may occur between the first and second cassette gas canisters 14 and 15 due to different ambient temperatures of the gas canisters 14 and 15, and a pressure difference ΔPC may occur between the first and second cassette gas canisters 14 and 15 due to the temperature difference. More specifically, the inner pressure of the first cassette gas canister 14 (hereinafter referred to as "inner pressure PC1" for convenience of description) may increase as compared to the inner pressure of the second cassette gas canister 15 (hereinafter referred to as "inner pressure PC2" for convenience of description).

The inner pressure PC1 of the first cassette gas canister 14 acts on the second check valve 72 from the secondary side (i.e., from the first-check-valve side), while the inner pressure PC2 of the second cassette gas canister 15 acts on the second cassette gas canister 72 from the primary side (i.e., from the second-one-way-valve side). The dome section 81b of the valve body 81 of the second cassette gas canister 72 elastically deforms due to the pressure difference (differential pressure) ΔPC between the primary-side pressure PC2 and the secondary-side pressure PC1, so that the dome section 81b is brought into abutment against the valve seat 82 to close the fuel passages 83.

By the fuel passages 83 being closed with the dome section 81b as noted above, the butane fuel let out from the first cassette gas canister 14 can be prevented from flowing into the second cassette gas canister 15. In this manner, the butane fuel (butane gas) contained in the first and second cassette gas canisters 14 and 15 can continue to be supplied to the gas engine 11 in a stable manner. Namely, using the first and second cassette gas canisters 14 and 15, the gas fuel supply apparatus 12 can secure an increased continued operating time and stable, continued supply of the butane fuel (butane gas).

Because the valve body 81 of the second check valve 72 is formed of an elastic material, the valve body 81 can be deformed with a minute pressure and thus, the valve body 81 can operate appropriately and reliably even when the secondary-side pressure PC1 of the second cassette gas canister 72 is slightly higher than the primary-side pressure PC2 of the second cassette gas canister 72.

Thus, the butane fuel of the first cassette gas canister 14 can be prevented from flowing into the second cassette gas canister 15 with an increased reliability, so that the butane fuel of the first cassette gas canister 14 can continue to be supplied to the gas engine 11 with an increased reliability.

Figure 9:
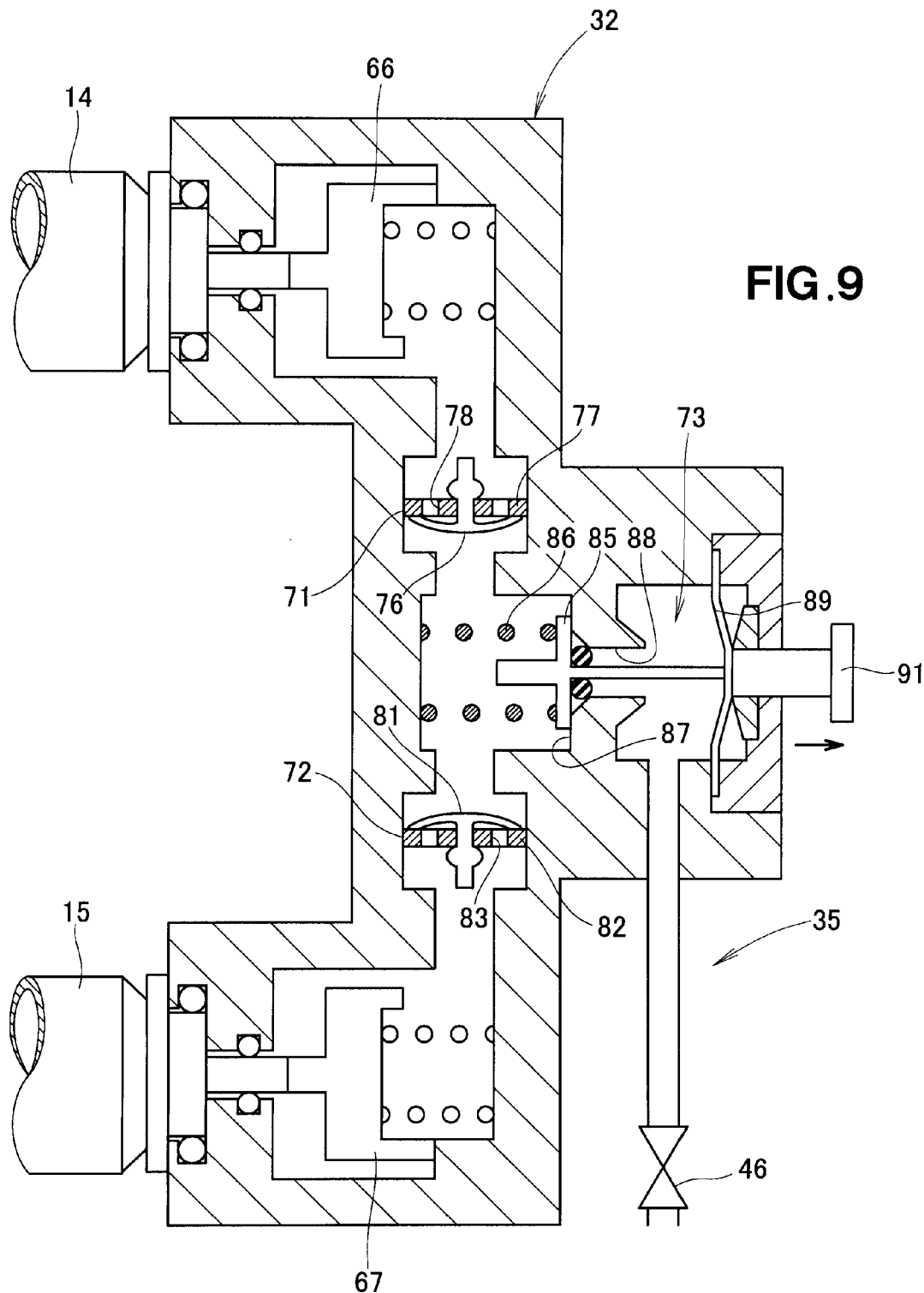
FIG. 9 is a view explanatory of an example manner in which the gas fuel supply apparatus responds to decrease in inner pressure of a butane gas fuel supply passage by means of a pressure-responsive valve.

The following describe an example manner in which the pressure-responsive valve 73 behaves when the inner pressure of the butane gas fuel supply passage 35 has lowered to a predetermined value in a range of, for example, 600 to 700 kPa, with reference to FIG. 9.

When the secondary-side pressure (i.e., pressure on the butane-switching-valve side) of the pressure-responsive valve 73 has lowered to the minimum butane pressure P3 in the range of, for example, 600 to 700 kPa, the valve body 85 of the pressure-responsive valve 73 moves to the valve seat 87, by the biasing force of a compression spring 86, to close a gas passage 88 of the valve seat 87, so that the pressure-responsive valve 73 is switched to a closed state. Thus, the pressure-responsive valve 73 can prevent the butane fuel from flowing from the first and second cassette gas canisters 14 and 15 to the gas engine 11.

As the valve body 85 of the pressure-responsive valve 73 moves to the valve seat 87 as noted above, a diaphragm 89 is pressed via the valve body 85 so that it elastically deforms into a valve-closing position. By such elastic deformation of the diaphragm 89, a switching knob 91 is pushed outwardly of the pressure-responsive valve 73 as indicated by a rightward black arrow.

Figure 8:
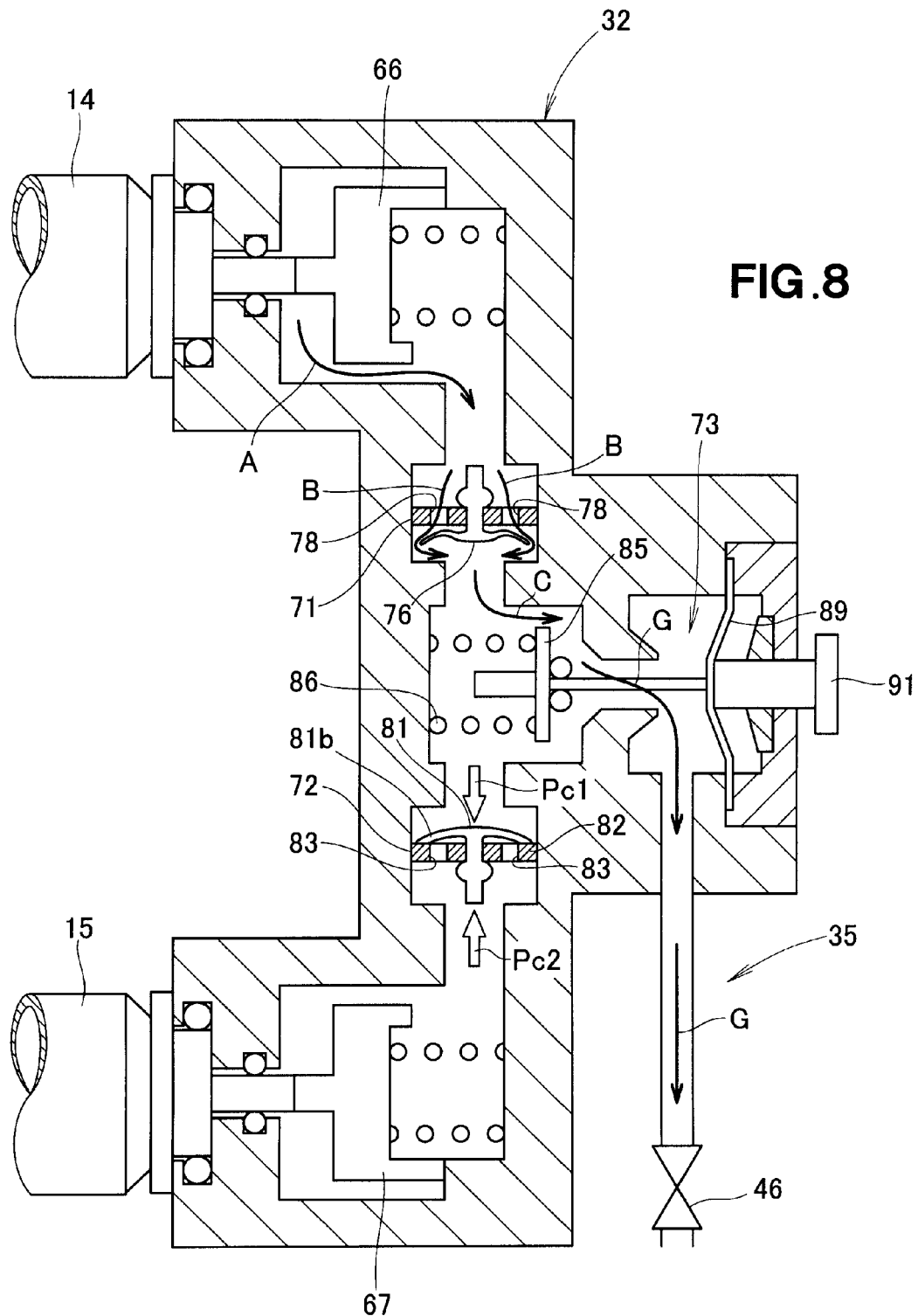
FIG. 8 is a view explanatory of an example manner in which the gas fuel supply apparatus responds to a differential pressure between the cassette gas canisters by means of first and second check valves.

Therefore, the diaphragm 89 can elastically deform into a valve-opening position (see FIG. 8) by the switching knob 91 being pushed toward the valve seat 87. In response to the diaphragm 89 elastically deforming into the valve-opening position like this, the valve body 85 can be returned (switched) back into a valve-opening position against the biasing force of the compression spring 86 as seen in FIG. 8.

Namely, by the provision of the pressure-responsive valve 73, the gas fuel supply apparatus 12 can keep the butane fuel, let out from the first and second cassette gas canisters 14 and 15, at or over the minimum butane pressure P3 in the range of, for example, 600 to 700 kPa. Thus, the gas engine 11 can be driven in an appropriate manner with the butane fuel let out from the first and second cassette gas canisters 14 and 15.

The following describe an example manner in which the gas engine 11 is driven with the propane gas, with reference to FIGS. 6, 10 and 11. As shown in FIG. 6, the propane gas fuel supply passage 34 and the butane gas fuel supply passage 35 join together at the position 37 upstream of the mixer 27.

Thus, the butane gas of the butane gas fuel supply passage 35 would flow into the propane gas fuel supply passage 34 as the gas engine 11 is driven with the butane fuel let out from the first and second cassette gas canisters 14 and 15. More specifically, the butane gas would flow into a portion 34a of the propane gas fuel supply passage 34 downstream of the propane switching valve 43.

Therefore, the gas engine 11 is often deactivated (i.e., driving of the gas engine 11 is terminated) with the butane gas having flown into and staying in the propane gas fuel supply passage portion 34a. Then, the negative pressure P5 of the crankcase 21 increases, so that the propane shutoff valve 44 and the butane shutoff valve 48 are closed.

In such conditions, the butane gas would stay in portions of the propane gas fuel supply passage 34 and butane gas fuel supply passage 35 which are located between the propane switching valve 43 and the propane shutoff valve 44 and between the butane switching valve 46 and the button shutoff valve 48. Such residual butane gas has the predetermined butane pressure P4 of, for example, 10 kPa.

Figure 10A:
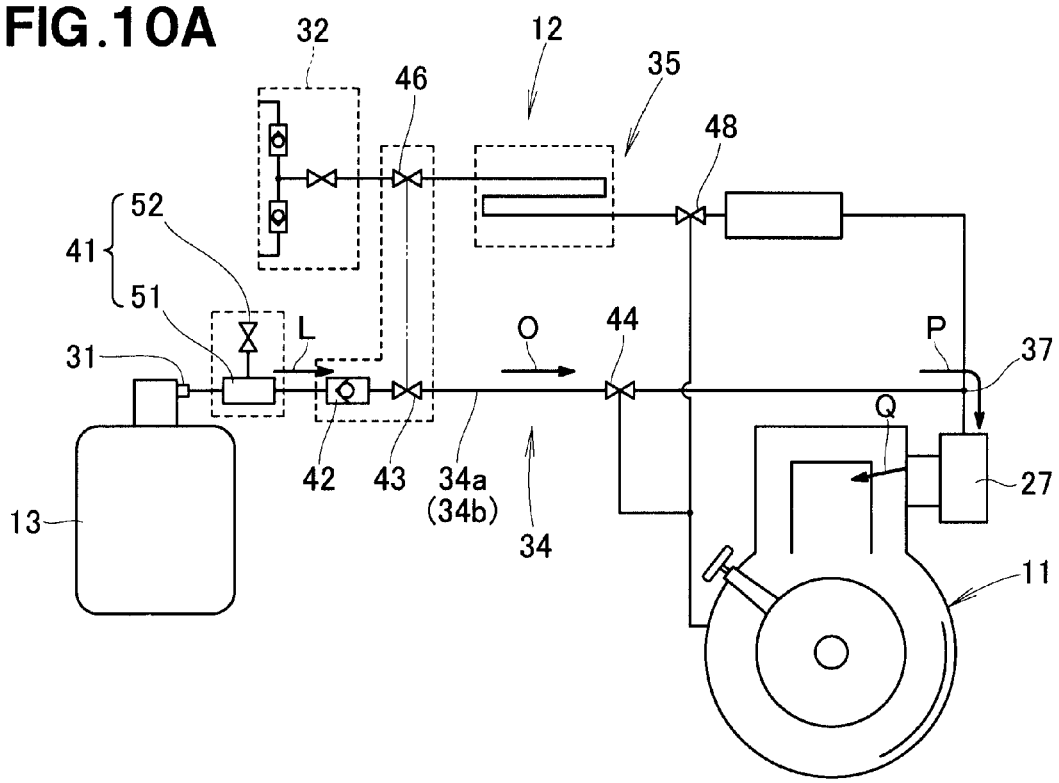
FIGS. 10A and 10B are views explanatory of an example manner in which flows of the butane gas are controlled via the first and second check valves when the gas engine is driven using the cassette gas canisters.

In the aforementioned conditions, the human operator performs operation for driving the gas engine 11 with the propane gas. Namely, first, the propane gas canister 13 is set onto the mouthpiece setting section 31, as shown in FIG. 10A. Then, the butane gas fuel supply passage 35 is switched to the closed state via the butane switching valve 46, while the propane gas fuel supply passage 34 is switched to the open state via the propane switching valve 43.

At that time, the butane gas is staying in a portion 34b of the propane gas fuel supply passage 34 at the predetermined butane pressure P4 of, for example, 10 kPa, and the relief valve 52 of the propane gas fuel supply passage 34 has been set at an opening pressure (referred to as "opening pressure P2" for convenience of description) of, for example, 5.6 kPa. Namely, the butane gas staying in the propane gas fuel supply passage portion 34b has a gas pressure P6 (FIG. 10B) higher than the opening pressure P2 of the relief valve 52. Consequently, the butane gas staying in the propane gas fuel supply passage portion 34b may be discharged to the atmosphere via the relief valve 52 by way of the propane switching valve 43.

Figure 10B:
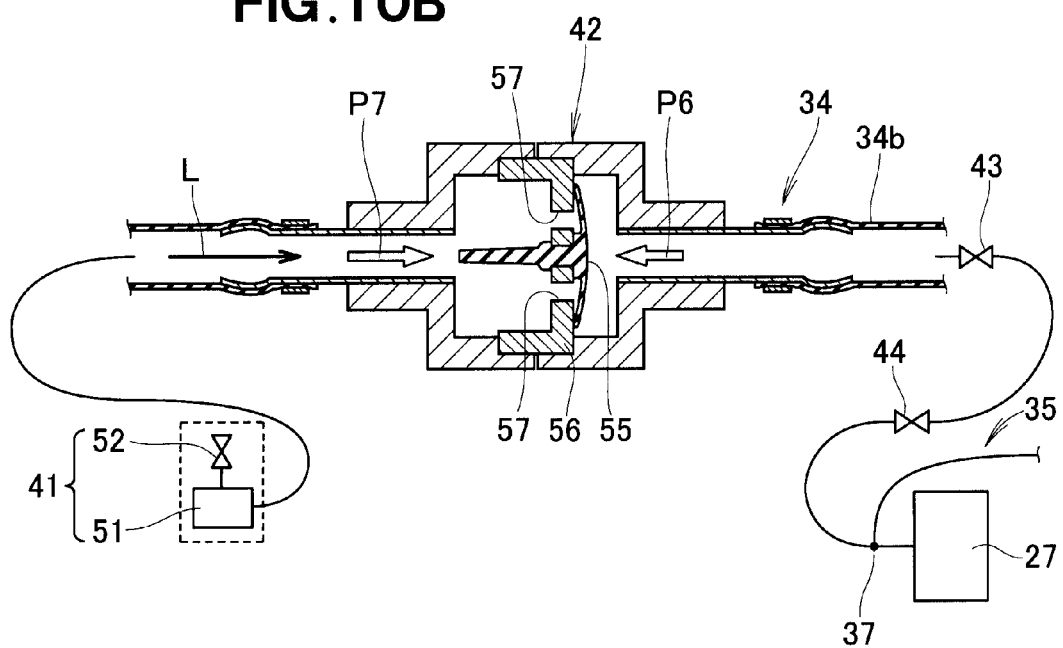

To avoid such discharge of the butane gas, the check valve 42 is provided immediately downstream of the relief valve 52, as shown in FIG. 10B as well as FIG. 10A. Thus, when the secondary-side pressure P6 of the check valve 42 (i.e., gas pressure in the supply passage portion 34b) is higher than the primary-side pressure P7 of the check valve 42 (gas pressure on the side of the check valve 42 closer to the relief valve 52, or relief-valve-side of the check valve 42), the gas passages 57 of the valve seat 56 can be closed with the valve body 55 of the check valve 42. In this way, the check valve 42 can prevent the butane gas, staying in the propane gas fuel supply passage portion 34b, from flowing to the relief valve 52 and thereby prevent the butane gas from being discharged via the relief valve 52 to the atmosphere.

Because the valve body 55 of the check valve 42 is formed of an elastic material, the valve body 55 can be deformed with a minute pressure, as noted above. Thus, the valve body 55 can operate appropriately and reliably even when the secondary-side pressure P6 of the check valve 42 (i.e., gas pressure in the supply passage portion 34b) is slightly higher than the primary-side pressure P7 of the check valve 42 (i.e., gas pressure on the relief-valve side of the check valve 42), namely, even when the pressure difference (differential pressure) $\Delta Pv$ is minute.

Thus, the check valve 42 can present the butane gas, staying in the supply passage portion 34b, from flowing to the relief valve 52, with the result that the plurality of types of gas fuels (i.e., butane gas and propane gas) can be used switchably in an appropriate manner.

Figure 11A:
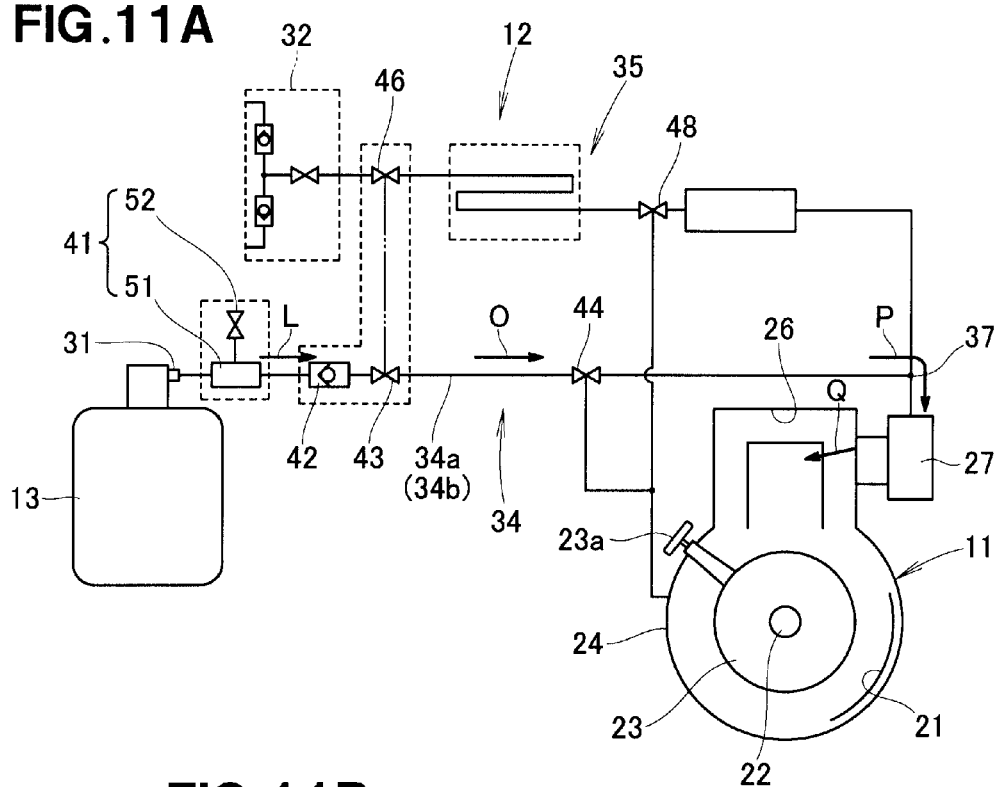
FIGS. 11A and 11B are views explanatory of an example manner in which the gas engine is driven using the cassette gas canisters.

The crankshaft 22 can be rotated by the human operator manually operating the operation knob 23a of the recoil starter 23, as shown in FIG. 11A. As the crank shaft 22 rotates like this, the inner pressure of the crankcase 21 lowers to the negative pressure P5 of, for example, −1.5 kPa, so that the propane shutoff valve 44 and the butane shutoff valve 48 are opened.

In response to the propane shutoff valve 44 being opened like this, the butane gas, having been staying in the supply passage portion 34b, is supplied into the gas engine 11 by way of the air-gas mixer 27 (FIG. 11A). Thus, the secondary-side pressure P6 of the check valve 42 (i.e., propane-switching-valve-side pressure of the check valve 42) becomes lower than the primary-side pressure P7 of the check valve 42 (i.e., pressure on the relief-valve side of the check valve 42). Consequently, the valve body 55 of the check valve 42 elastically deforms to open the gas passages 57.

Because the valve body 55 of the check valve 42 is formed of an elastic material, the valve body 55 can be elastically deformed with a minute pressure, as noted above. Thus, the valve body 55 can operate appropriately and reliably even when the primary-side pressure P7 (i.e., relief-valve-side pressure gas pressure) of the check valve 42 is slightly higher than the secondary-side pressure P6 (i.e., propane-switching-valve-side pressure) of the check valve 42.

Figure 11B:
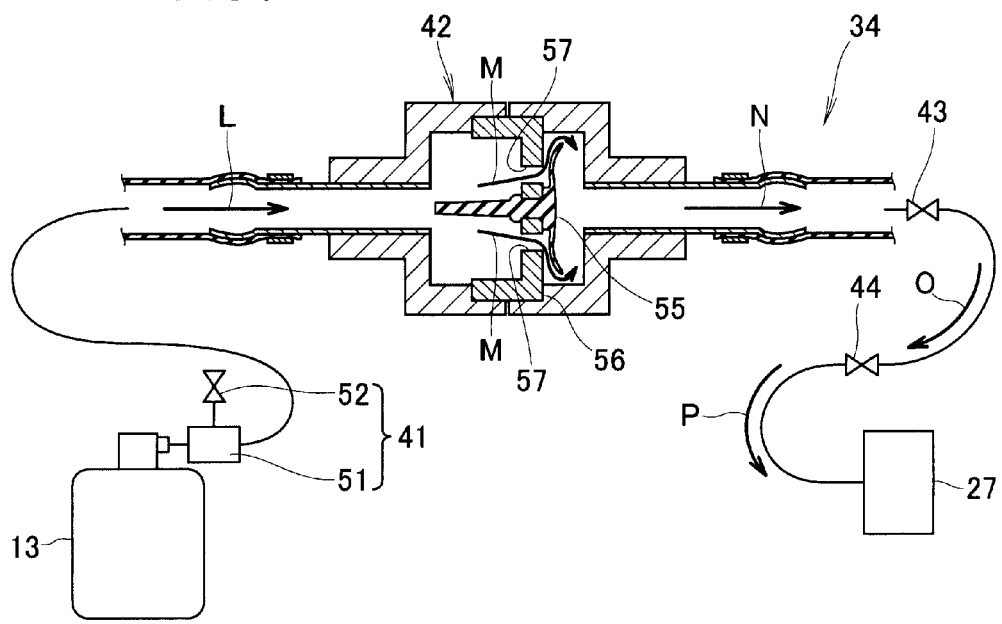

In response to the gas passages 57 being opened as noted above, the propane gas is let out from the gas canister 13, as shown in FIG. 11B. The thus-let-out propane gas is adjusted by the propane regulator 51 of the regulator unit 41 to the predetermined propane pressure P1 of, for example, 2.8 kPa. The propane gas, having been thus adjusted to the predetermined propane pressure P1, flows to the check valve 42 as indicated by arrow L.

The propane gas, having flown to the check valve 42, flows through the gas passages 57 as indicated by arrow M and further flows to the propane switching valve 43 as indicated by arrow N.

Then, the propane gas flows from the propane switching valve 43 to the propane shutoff valve 44 as indicated by arrow O, from which it further flows to the air-fuel mixer 27 as indicated by arrow P.

Referring back to FIG. 11A, the air-fuel mixer 27 mixes together the propane gas and air, and the resultant mixture of the propane gas and air is supplied to the combustion chamber 26 of the engine block 24 (cylinder 25) as indicated by arrow Q. Thus, the gas engine 11 (more specifically, the crankshaft 22) is driven by the mixture of the propane gas and air being combusted in the combustion chamber 26.

According to the embodiment of the gas fuel supply apparatus 12, as described above in relation to FIGS. 6, 10 and 11, the valve body 55 of the check valve 42 is formed of an elastic material, so that the valve body 55 can operate appropriately and reliably even when the primary-side pressure P7 (i.e., relief-valve-side pressure) of the check valve 42 is slightly higher than the secondary-side pressure P6 (i.e., propane-switching-valve-side pressure) of the check valve 42. Thus, even when the primary-side pressure P7 of the check valve 42 is slightly higher than the secondary-side pressure P6 of the check valve 42, the propane gas can be appropriately supplied to the gas engine 11 through reliable operation of the valve body 55.

It should be appreciated that the gas fuel supply apparatus 12 of the present invention may be modified variously as necessary without being limited to the above-described embodiment.

For example, whereas the embodiment of the gas fuel supply apparatus 12 has been described above as applied to the gas engine 11, the present invention is not so limited, and the gas fuel supply apparatus 12 of the present invention may be applied to other gas combustion apparatus, such as gas stove burners.

Further, whereas the embodiment of the gas fuel supply apparatus 12 has been described above as using two cassette gas ganisters (i.e., first and second cassette gas ganisters 14 and 15), the present invention may use only one cassette gas ganister, or another plurality of cassette gas ganisters, such as three cassette gas ganisters.

Further, whereas the embodiment of the gas fuel supply apparatus 12 has been described above in relation to the case where butane gas is contained in the first and second cassette gas ganisters 14 and 15 and propane gas is contained in the gas canister 13, other desired types of gas than the aforementioned may be contained in the first and second cassette gas ganisters 14 and 15 and gas canister 13.

Furthermore, the shapes and constructions of the gas engine system 10, gas engine 11, gas fuel supply apparatus 12, gas canister 13, first and second cassette gas ganisters 14 and 15, propane gas fuel supply passage 34, butane gas fuel supply passage 35, check valve 42, propane switching valve 43, butane switching valve 46, valve body 55, valve seat 56, gas passage 57, etc. are not limited to the aforementioned and may be modified as necessary.

The basic principles of the present invention are well suited for application to gas engines capable of supplying a plurality of types of gas fuels, having different working pressures, to a gas combustion section while switching between the plurality of types of gas fuels.

What is claimed is:

1. A gas fuel supply apparatus for supplying a gas fuel to a gas combustion apparatus, comprising:

gas container attachment means for attaching thereto a plurality of gas containers that contain respective ones of a plurality of types of gas fuels having different working pressures, the plurality of gas containers attached to the gas container attachment means communicating with corresponding gas fuel supply passages so as to supply the gas fuels to the gas combustion apparatus via the corresponding gas fuel supply passages, the gas fuel supply passages including a first gas fuel supply passage for one of the gas fuels which has a low working pressure and a second gas fuel supply passage for other of the gas fuels which has a higher working pressure than the one gas fuel, the first gas fuel supply passage and the second gas fuel supply passage joining together at a position upstream of the gas combustion apparatus;

switching means provided in the gas fuel supply passages, the gas fuel to be supplied to the gas combustion apparatus being switchable between the plurality of types of gas fuels via the switching means;

the switching means comprising a first switching valve disposed in the first gas fuel supply passage and operable to open or close the first gas fuel supply passage and a second switching valve disposed in the second gas fuel supply passage and operable to open or close the second gas fuel supply passage, the first and second switching valves being operatively linked together such that when one of the first switching valve and the second switching valve is in an open position, the other of the first switching valve and the second switching valve is in a closed position, and when said one switching valve is disposed in a closed position, the other switching valve is in an open position; and a check valve provided in the first gas fuel supply passage, corresponding to the gas container that contains the gas fuel having the low working pressure, the check valve preventing the gas fuel having the higher working pressure from flowing from a downstream side of the check valve closer to the gas combustion apparatus to an upstream side of the check valve closer to the gas container attachment means.

2. The gas fuel supply apparatus of claim 1, further comprising a relief valve provided, in the first gas fuel supply passage for the gas fuel having the low working pressure, between the check valve and the gas container attachment means, the relief valve being disposed on an upstream side of the first switching valve as viewed from a direction of supply of the fuel gas having the low working pressure.

3. The gas fuel supply apparatus of claim 1, wherein the check valve includes a valve seat, and a valve body formed of an elastic material into a dome shape and mounted on the valve seat, and a gas passage formed through the valve seat, the gas passage being normally closed with the valve body so that the gas fuel having the higher working pressure can be prevented from flowing from the downstream side of the check valve to the upstream side of the check valve.

4. The gas fuel supply apparatus of claim 2, wherein the check valve is disposed on an upstream side of the first switching valve.

5. The gas fuel supply apparatus of claim 1, wherein the gas combustion apparatus comprises a gas engine drivable with the plurality of types of as fuels and having a crankcase, and wherein the gas fuel supply apparatus further includes a first shutoff valve disposed in the first gas fuel supply passage between the first switching valve and the joining position between the first and second gas fuel supply passages and a second shutoff valve disposed in the second gas fuel supply passage between the second switching valve and the joining position between the first and second gas fuel supply passages, the first and second shutoff valves being operable to open and close depending on an internal pressure of the crankcase of the gas engine such that the first and second shut off valves are open due to a negative pressure created in the crankcase when the gas engine is running, and the first and second shutoff valves are closed due to disappearance of the negative pressure in the crankcase when the gas engine is stopped.

6. The gas fuel supply apparatus of claim 1, wherein the gas fuel having the low working pressure is a first fuel let out from a corresponding one of the plurality of gas containers in gas form, and the gas fuel having the higher working pressure is a second fuel led out from a corresponding one of the plurality of gas containers in liquid form, and wherein the gas fuel supply apparatus further comprises:

a regulator unit disposed in the first gas fuel supply passage between the gas container attachment means and the first switching valve, the regulator unit including a first regulator for adjusting the pressure of the first fuel to a first predetermined value, and a relief valve operable to open when the pressure of the first fuel exceeds a second predetermined value, the second predetermined value being higher than the first predetermined value; and a vaporizer for vaporizing the second fuel and a second regulator for regulating the pressure of the vaporized second fuel to a second predetermined value, the vaporizer and the second regulator being disposed in the second gas fuel supply passage between the second switching valve and the joining position between the first and second gas fuel supply passages with the vaporizer located upstream of the second regulator.

* * * * *